Sept. 12, 1939.   B. BROWNSTEIN   2,172,901
HYDRAULIC PRESSURE AND FLOW CONTROLLER
Filed May 18, 1935   4 Sheets-Sheet 2

Inventor
B. Brownstein
By Watson E. Coleman
Attorney

Patented Sept. 12, 1939

2,172,901

UNITED STATES PATENT OFFICE 2,172,901

HYDRAULIC PRESSURE AND FLOW CONTROLLER

Benjamin Brownstein, Ellwood City, Pa.

Application May 18, 1935, Serial No. 22,258

10 Claims. (Cl. 137—153)

This invention relates to machines operated by hydraulic pressure such as presses, testers, machine tools and the like, and particularly to means for automatically controlling the flow and pressure of water discharged by a pump into the feed line of such machines.

The general object of my invention is to provide a mechanism of this character which will maintain a constant pressure on the feed line of one or a plurality of machines and take care of the surplus or "waste" water if there be any.

A further and more detailed object is to provide means whereby the kinetic pressure delivered can be changed in an instant either to a higher or lower pressure, as may be desired, and in which the pressure can be varied at the will of the operator from zero to maximum and vice versa, or from a given minimum to a given maximum and returned to a minimum under the control of the operator, and in this connection to provide a mechanism which once fixed at a certain pressure, will maintain that pressure so long as the pump or pumps work independent of the working presses or other machines.

A further object is to provide mechanism of this character which is relatively simple and, therefore, not expensive, which takes very little space, and which can be connected to the feed line at any place desired and, if desired, be placed near the machine to be controlled, so that the machine operator can operate the control, or which can be equipped with reduction gears and an electric motor to operate by remote control.

A further object is to provide mechanism of this character whereby machine tools, presses, etc. can be started or stopped without causing any shock in the pump or feed line, thus permitting the pump to operate at normal load at all times without any fluctuations whether the driven machines are working or not.

A further object is to provide a pressure and flow controller whereby presses and other machines with hydraulic feed can be adjusted to operate with just the proper force necessary for use of any kind of material or size or part to be produced. Thus, presses whose ranges in size of products are very large can be arranged to have just the proper operating force for every size article produced, these changes in driving pressure being accomplished by a very simple adjustment.

Other objects will appear in the course of the following description.

My invention is illustrated in the accompanying drawings wherein.

Figures 3, 4:
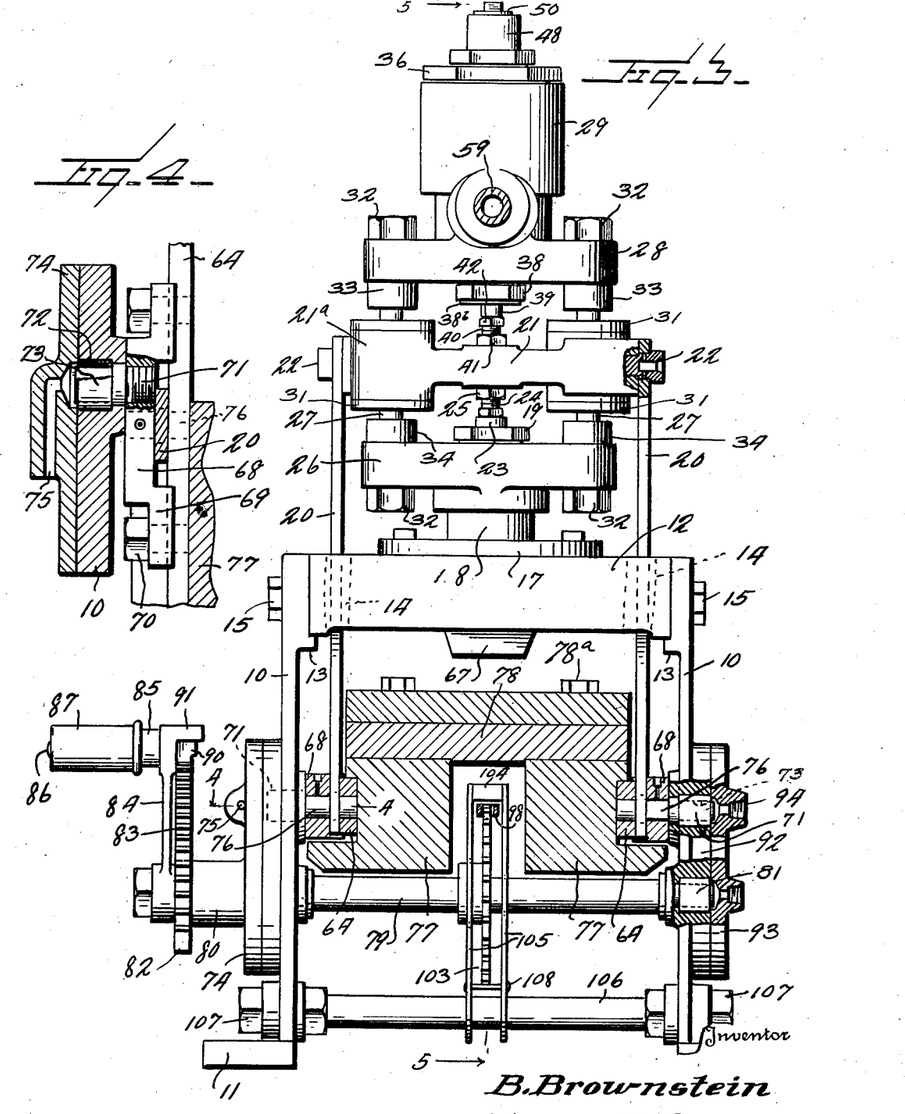
Figure 3 is a front elevation looking from the right in Figure 1, the weight arms and weights being in section.
Figure 4 is a fragmentary section on the line 4—4 of Figure 3.
Figures 7, 8, 9, 10:
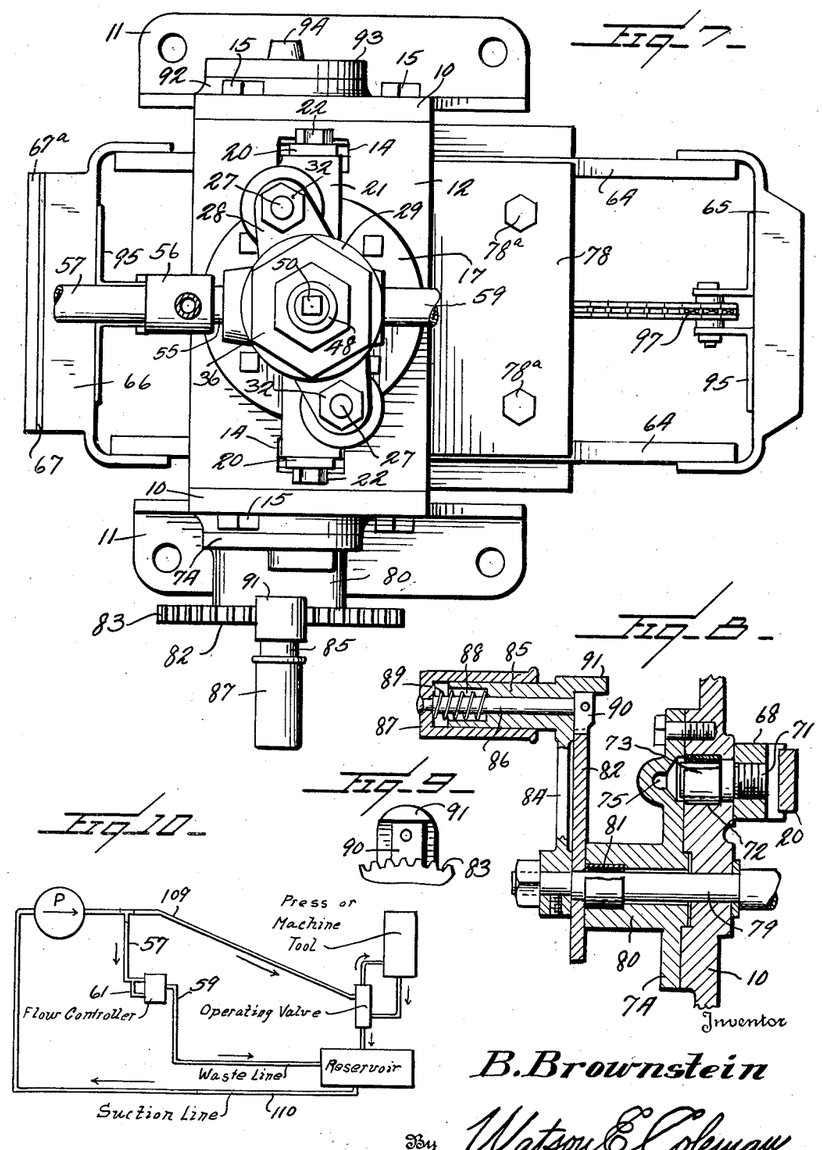
Figure 7 is a top plan view of the machine.
Figure 8 is a fragmentary section on the line 8—8 of Figure 1.
Figure 9 is a fragmentary elevation of the means for locking the crank shown in Figure 8 to its sector.
Figure 10 is a schematic diagram showing the connection of my machine to the pump and the machine being operated.

Referring to these drawings, and particularly to Figures 1, 3, 5 and 7, 10 designates a pair of side frame elements flanged, as at 11, whereby the machine may be bolted to any suitable base. Disposed between these frame elements is a table 12 which, as shown in Figure 3, rests upon flanges 13 extending inward from the members 10. This table has oppositely disposed slots 14, as shown in Figure 7, and the table is held to the supports 10 by means of the screws 15.

The center of the table 12 is open, as at 16, and resting upon the table is the base plate 17 of a cylinder 18, the lower end of this cylinder being closed except for an inlet pipe, the upper end of the cylinder being provided with a stuffing box and packing, the gland of the stuffing box being designated 19. Operating through the slots 14 are a pair of links 20, the lower ends of these links being connected to a weighted lever, as will be later stated, the upper ends of these links being connected to a cross head 21 by means of the screws 22. Operating within the cylinder 18 and through the gland 19 of the stuffing box is a plunger or ram 23 which is disposed beneath an adjusting screw 24 carried by the cross head 21, this screw extending downward toward the plunger 23 and the screw being held in adjusted relation with regard to the plunger and the cross head by means of the lock nut 25.

Figures 1, 2:
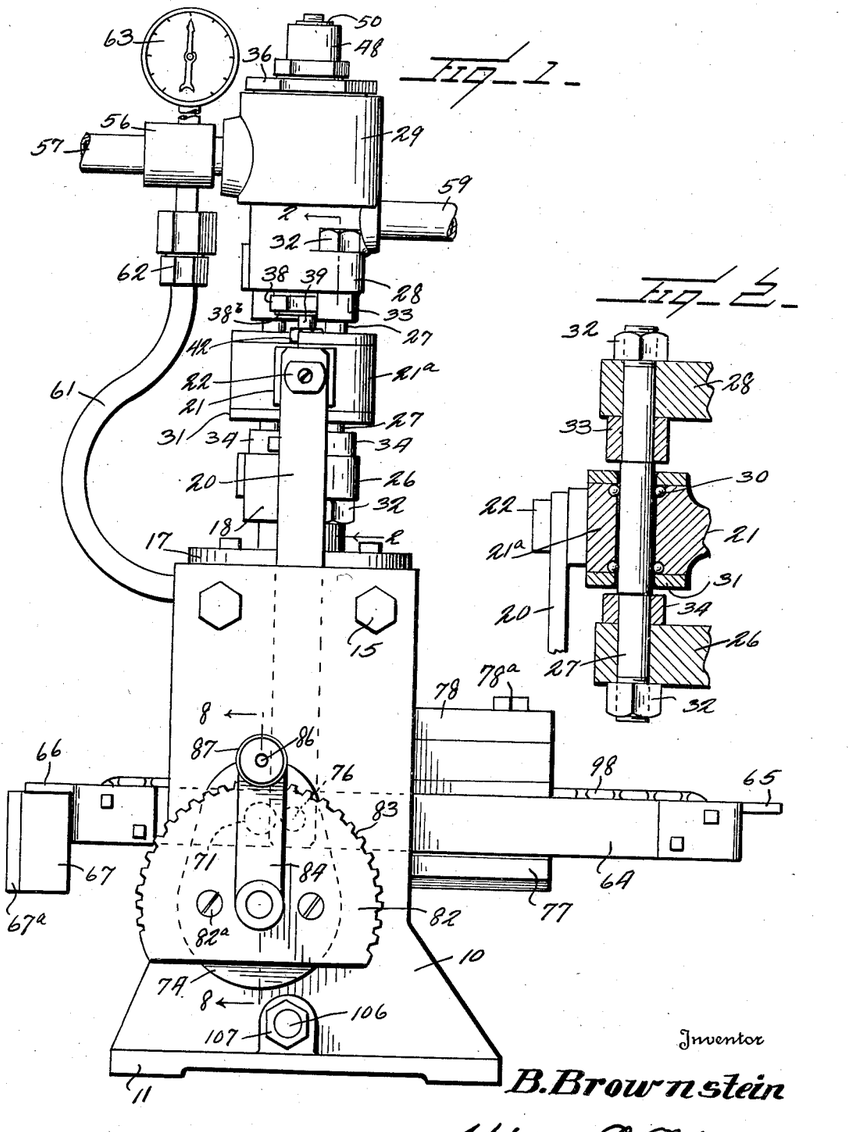
Figure 1 is a side elevation of my improved pressure and flow controller.
Figure 2 is a fragmentary sectional view on the line 2—2 of Figure 1.
Figures 5, 6:
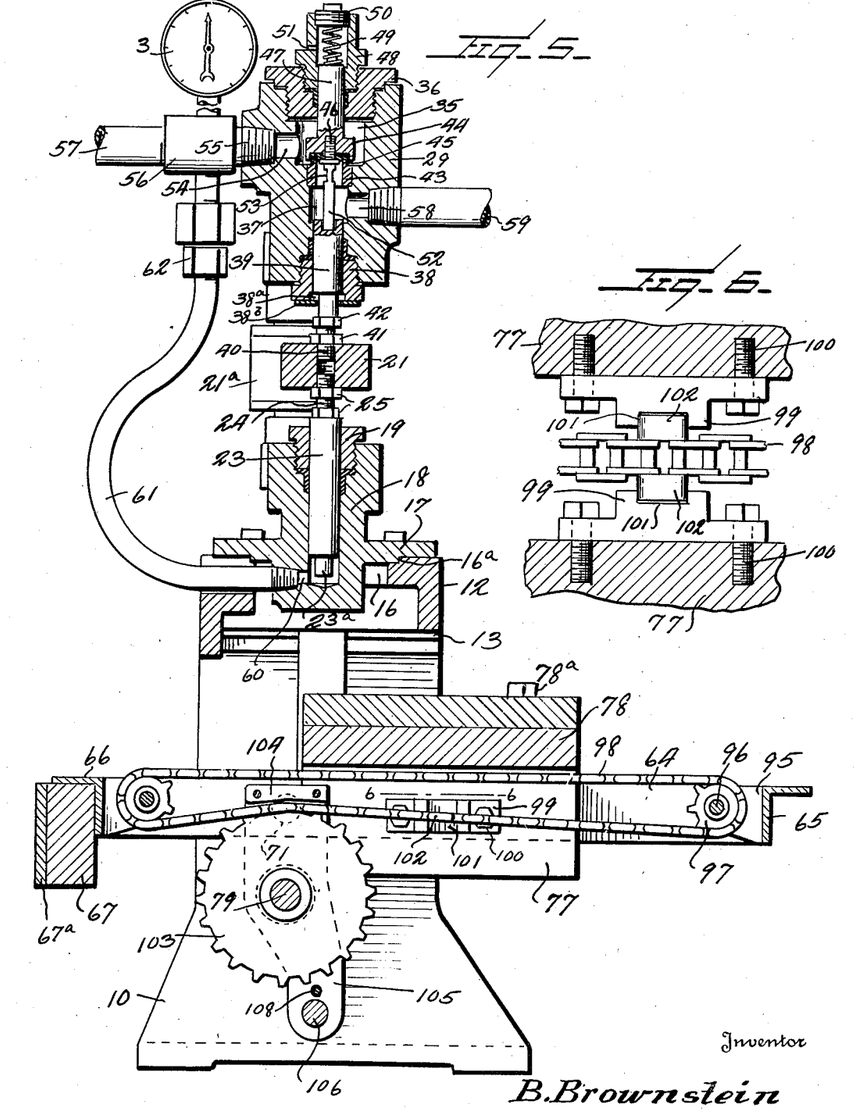
Figure 5 is a vertical section on the line 5—5 of Figure 3.
Figure 6 is a fragmentary section on the line 6—6 of Figure 5.

Formed as part of the cylinder 18 is the cross bar 26, as shown in Figure 3, and extending up through the ends of the cross head 21, as shown in Figure 2, are rods 27 constituting tie rods for the cross bars and guides for the cross head, the upper ends of these rods passing through a cross bar 28 forming part of a valve casing 29, shown in section in Figure 5, and in elevation in Figure 3. The cross head 21, as shown in Figure 2 is bored for the passage of the tie rods 27 and is provided with anti-friction balls 30 which engage the tie rods and are held in place in the ball recess by the caps 31. The upper and lower ends of the tie rods 27 are provided with nuts 32 and between the enlarged ends 21ª of the cross head 21 and the extremities of the cross bars 26 and 28, there are provided sleeves 33 and 34, which space the cross bars 26 and 28 from the cross head and from each other.

The valve casing 29 is formed at its upper end with a chamber 35, this chamber being closed at its upper end by means of the cap 36 having screw threaded engagement with the wall of the chamber, this cap having a central bore. Below the chamber 35, the valve casing 29 is provided with a chamber 37. The lower end of the casing 29 is provided with a stuffing box designated generally 38, and operating through this stuffing box is a piston or plunger 39 having a downwardly extending stem opposed to a screw 40 which extends into and has screw threaded engagement with the cross head 21 and is held in adjusted position by means of the lock nut 41. The screw just above the lock nut 41 is provided with a head 42. Disposed between the chamber 35 and the chamber 37 is a valve seat 43, and adapted to rest upon this seat and adapted to coact with this seat is a flow controlling valve 44, the lower end of which is provided with a packing disk 45 held in place by a screw 46. The upper end of the valve 44 is formed to provide a cylindrical stem 47 which operates through a packing gland 48. This gland is hollow at its upper end and disposed within the hollow interior of the gland is a spring 49, which bears against the upper end of the stem 47 and which is engaged at its upper end with a screw plug 50, as shown clearly in Figure 5. The packing gland 48 is provided with a small port 51 to permit the free movement of the stem 47 within the packing gland. The spring 49 urges the valve 44 to its seat 43. The upper end of the piston or plunger 39 is provided with a recess and loosely disposed within this recess is the lower extremity of a valve lifting rod 52 which is formed as part of the screw 46 and depends therefrom, this valve lifting rod being provided with opposed flattened portions 53 whereby a wrench may be applied to turn the screw 46 into the lower end of the valve 44.

The chamber 35 has a port 54 into which extends the screw threaded end of a pipe fitting 55, this pipe fitting being carried by a T 56, which receives an inlet pipe 57 leading from the pump, as shown in Figure 10. Below the valve seat 43, the chamber 37 is provided with an outlet port 58 from which a waste pipe 59 extends to the reservoir and return line, as also shown in Figure 10. The cylinder 18 at its lower end is provided with an inlet port 60 into which a pipe 61 extends, this pipe being connected by any suitable coupling 62 to the T 56. This T also carries upon it the pressure gauge 63. It will, therefore, be seen that the fluid under pressure coming from the pump P shown in Figure 10 will pass into the chamber 35. The same liquid under pressure will pass down through the pipe 61 and then to the lower end of the cylinder 18 and under certain circumstances of operation, as will be stated later, acts to lift the plunger 23, lifting up the cross head 21, raising the valve 44 and permitting a certain amount of the water to pass off through the waste pipe 59. The spring 49 which bears against the upper end of the control valve 44 is set for just enough compressive force to overcome the resistance produced by the packing on the stem at the low atmospheric pressure. The valve stem must be made to have a fit in the packing tight enough to prevent leakage of the liquid at this low pressure. This tightness prevents the control valve 44 from moving downward when in its uppermost position unless some means is used to move the valve downward and close it. The spring, therefore, is used for this purpose. The spring is a relatively light spring. Attention is particularly called to the fact that the valve 44 is entirely free to move to any height within the clearance space and though the resistance of the spring 49 is all that the liquid must overcome in lifting the valve higher after it has been slightly lifted by the cross-head, yet as a matter of actual practice, the pressure of the liquid never does lift the valve any higher than the distance it has been lifted by the upward movement of the cross-head 21. The reason is because the liquid acting on the top of valve 44 prevents the valve from lifting any higher. It will be noted that the cross-head 21 is limited in its movement by top and bottom stops 33 and 34 (see Fig. 3). The distance of movement of the cross-head is only ⅛ in. and the valve 44 will only be lifted ⅛ in. When the valve is raised this ⅛ in., it produces an opening whose area is equal to the area of the inlet 54. As a matter of fact, however, the valve is never raised more than .016 in. and in actual practice, therefore, the outlet opening beneath the valve is only 12.8% of the total area of the inlet 54. Because of the reduction in area of the outlet opening through the valve seat, the liquid velocity must increase through the valve seat and this allows the same volume to flow out of the valve casing 29 as flows in at 55.

Of course, the cross-sectional area of the ram 23 must be greater than the area of valve 44 in order to overcome the resistance of the packing of the ram, valve stem and spring. The pressure being the same per square inch on the upper face of the valve 44 and on the ram, the ram has a greater working force and can operate the valve when conditions require it. As a matter of illustration, it may be said that the ram may have a diameter of ¾ in. with an area of .4418 sq. in. The area of the valve which sustains the pressure of the water will be .17257 which gives .2692 sq. in. in favor of the ram 23. Thus at a pressure of 1000 pounds per sq. in., the ram has a working force of 441.8 pounds while the valve has a working force of 172.57 pounds and there is a difference in favor of the ram of 269.2 pounds. It is also to be particularly noted that whatever pressure the control weight is set for, the liquid pressure is the same both on the ram and the valve. Inasmuch as the pressure receiving areas of the valve and ram are constant, the conditions governing the valve and ram are constant, hence the opening of the valve is constant for all pressures.

Attention is called to the fact that in actual practice, while it is not necessary to have a large force on the valve 44 pressing it against the valve seat, it is necessary to have the two surfaces of the valve and its seat parallel and smooth, so that when the two surfaces are brought together, they fit perfectly and produce a sealed joint.

The movement of the cross head 21 under the action of the piston or plunger 23 is resisted by means of adjustable weights and a lever upon which the weights are mounted. To this end, two weight supporting arms 64 are provided, as shown in Figures 1, 3, 5 and 7, these arms being connected at one end by a cross bar 65, bolted, welded or otherwise attached to the ends of the arms 64, and at the other ends, the arms are connected by a cross bar or yoke 66. These yokes 65 and 66, as shown in Figure 5, are angular in cross section and the yoke 66 supports a transversely extending balancing weight 67 which balances the long arm of the lever.

For the purpose of pivotally supporting these arms 64 upon the vertical side frames 10, I provide, as shown in Figure 4, a bracket 68 mounted upon each arm 64, each bracket at its ends having offset feet 69 grooved to engage the arm 64, as shown in Figure 4, and held to the corresponding arm 64 by means of the bolts 70. The feet 69 hold the body of the bracket away from the corresponding arm 64 so as to leave space for the corresponding link 20. Pivotally engaging each bracket 68 with the corresponding side member 10, as shown in Figure 4, is a pivot screw 71. The plate 10 is provided with a chamber 72 for the reception of a needle bearing 73 carried upon the screw 71. The screw 71, therefore, constitutes a trunnion oscillating within the needle bearing. Disposed exteriorly to the frame member 10 is a plate 74 which provides a bearing for a shaft to be later described, this plate 74, as shown in Figure 4, being provided with a passage 75 whereby the nozzle of an "Alemite" gun may be introduced into the opening 75 and lubricant injected into the bearing. The links 20 are pivoted to the arms 64 by pivot pins 76 which, as shown in Figure 4, are disposed closely adjacent to the trunnions 71. Therefore, a very slight oscillation is given to the weight supporting frame constituted by the arms 64 and the yokes 65 and 66 upon a movement of the links 20 due to the reciprocation of the plunger 23.

Slidingly mounted upon the arms 64 of the weight supporting frame is the weight comprising two oppositely disposed sections 77, as shown in Figure 3, these sections having portions extending outward beneath the arms 64 and the bracket 68. These sections 77 are spaced apart and support a plurality of sectional weights 78 which may be varied in number or thickness.

Extending through the side frames 10, as shown most clearly in Figures 3 and 8, is a shaft 79. This shaft has reduced end portions which pass through the side plates 10 and at one end the shaft passes through a tubular bearing collar 80, which is formed with the plate 74. The outer end of the bore of this collar is counter-bored, as shown in Figure 8, and the shaft 79 has needle bearings 81 fitting within this counterbore. The shaft 79 also passes through a locking segment 82, shown in Figures 1 and 8, this segment being held to the collar 80 by means of two screws 82a so that the segment cannot oscillate. The arcuate edge of this segment is provided with teeth 83. Mounted upon the end of the shaft 79 just beyond the plate 82 is an adjusting arm 84 whereby the shaft may be rotated. The extremity of this arm 84 carries upon it a tubular wrist pin or handle 85, shown in Figure 8, and extending through the bore of this wrist pin 85 or crank handle is a pin 86 which at its outer end carries a cap 87 which loosely surrounds the wrist pin 85 which is capable of rotation thereon. The handle 85 is counter-bored at its outer end at 88, and disposed within this counter-bore is a coil spring 89 which bears at one end against the bottom of the counter-bore and at the other end bears against the cap 87. Carried upon the inner end of this pin is a locking dog 90, shown in Figure 9, which dog has teeth engaging the teeth 83 of the segment 82. The tubular sleeve or handle 85 has an inwardly projecting lug 91 having a flat underface, as shown in Figure 9, which engages with the flat upper edge face of the dog 90 and thus prevents the dog and the pin 86 from rotating.

It will be seen that with this mechanism, when it is desired to adjust the crank 84, the cap 87 is pushed inward against the action of the spring 89 which will shift the dog 90 out of engagement with the teeth 83, then the crank handle may be shifted to the right or left in Figure 1, and then locked in position by releasing the cap 87, whereupon the spring 89 will pull the dog back into locking engagement with the teeth 83.

The bearing 81 previously referred to is a needle roller bearing and the opposite end of the shaft 79 is also mounted in needle roller bearings 81 carried within a projecting thickened portion 92 formed on the opposite plate 10. The cover plate 93 is attached to this thickened portion 92 and is provided with interiorly screw threaded openings 94 constituting an "Alemite" push type fitting whereby lubricant may be forced into the bearings for the shaft 79 and to the bearings for the trunnion 71 on this side.

The yokes 65 and 66 carry upon them the supporting brackets 95 which support the shafts or pins 96 for sprocket wheels 97. Passing over these sprocket wheels is an endless sprocket chain 98 (see Figure 5) which is connected to the opposed weight sections 77 by the means shown in detail in Figure 6. To this end, the inside faces of these weight sections 77 have attached thereto the opposed blocks 99, these blocks being held in place by the screws 100 and each block having upon its face the vertical recess 101. Carried by the links of the chain 98 are the two outwardly projecting lugs 102 which slidingly engage in these vertical recesses 101. Thus, while the lower flight of the chain 98 may move vertically with relation to the weight sections 77, yet the longitudinal movement of the chain will slide these weight sections upon the upper faces of the arms 64 toward or from the pivotal center of the arms. This sprocket chain 98 is engaged by a sprocket wheel 103 mounted upon the shaft 79. A guard 104 extends over the wheel 103, as shown in Figures 3 and 5, and is disposed in sufficient proximity to the wheel 103 as to hold the sprocket chain in engagement with the teeth of the sprocket wheel 103 and prevent any chance of the sprocket chain slipping out of engagement with these teeth. This guard 104 is supported by two lateral members 105 through which the shaft 79 passes, these members at their lower ends being apertured for the passage of a bolt 106, this bolt passing through the lateral frame members 10, as shown in Figure 3, and being held in place thereon by the opposed nuts 107. A rivet 108 holds the two bars 105 in proper spaced relation. It will be seen that with this construction, the weight constituted by the weight sections 77 and 78 may be shifed toward or from the pivotal point of the weight supporting arms so as to secure the correct balance for these arms, as will be later described. The weight 78 may be held in place upon the weight sections 77 by means of the screws 78ª, as shown in Figure 7. Any other suitable means for this purpose may be used, however.

The operation of this flow and pressure controller is as follows:

When the pump is started and liquid enters the valve chamber of the control valve 44, assuming the control valve to be closed, the liquid after it fills the chamber presses on the top of valve 44 and forces it to the valve seat 45, thus locking the liquid within the valve chamber. Simultaneously with the filling of the valve chamber, the cylinder 18 is also filled, thus causing the ram 23 to rise a predetermined amount so that it will float on the liquid in the cylinder and eventually come in contact with the adjusting screw 24 of the cross-head 21. Since the control valve 44 is locked to its seat by the liquid pressure above it, the liquid in the valve chamber cannot leave the chamber. The liquid being forced inward by the pump is, therefore, forced to act on the ram 23 which is free to move upward, thus coming in contact with the adjusting screw 24 and raising the cross-head 21. This produces a reacting pressure on the liquid in the cylinder 18 caused by the control weight 78 through the links 20 and cross-head 21, adjusting screw 24 and ram 23. At this time, the cross-head has not risen sufficiently to open the valve. The valve remains closed and the pressure on the ram, due to the weight 78, is transmitted through the feed line to the pump and the liquid in the pipe line system. If the ram continues to rise, due to the inflow of the liquid into cylinder 18, the ram rises another predetermined amount and brings the adjusting screw 42 into contact with the valve operating rod 39 and in turn with the valve stem 52, lifting the control valve 44 from its valve seat, thus allowing the liquid to flow into the lower chamber 37 and from there out through pipe 59 leading to the reservoir or to the sewer, as may be desired. The liquid as it flows between the control valve 44 and its seat 45 is under pressure and is balanced by the liquid pressure on top of the control valve, thus maintaining the pressure in the feed line while the liquid is flowing into the atmosphere pressure chamber 37 and from thence to the reservoir. The pressure in the control valve chamber and the liquid flow to the chamber 37 and out is completely controlled by the liquid itself and so is the lifting or opening of the control valve 44 from its seat 45 controlled by the volume of the liquid itself. The control valve 44 never opens to the full amount so that the opening area will be equal to the area of the inlet pipe 55. The opening area of the control valve is about 12.8% of the area of the inlet pipe, thus producing a high velocity in the liquid as it passes between the control valve 44 and the valve seat. During all this period, the ram is floating on the liquid and maintaining a constant pressure in the liquid throughout the system but the flow of the liquid is controlled by valve 44. The constant pressure transmitted through the ram to the water in the feed line is indicated by the pressure gauge 63. The lower end of the plunger 23 is reduced in diameter, as at 23a so as to permit water to pass beneath the lower end of the plunger 23 even when the plunger is in its fully lowered position.

The amount of opening of the valve 44 is inversely proportional as the ratio of the pump capacity is to the water consumed by the presses or machinery. Thus, as the consumption of water by any machine or machines decreases, the opening of the flow and volume controlling valve 44 correspondingly increases and vice versa. While the excess water is allowed to flow out through the pipe 59 to the reservoir, the pressure in pipe 57 and the feed pipe 109 is constantly maintained at a predetermined point because the ram floats on the water in the feed line 109, thus creating a head of resistance against which the pump must operate.

Tests for this mechanism have shown that the pressure is maintained, even though all the water discharged by the pump is discharged through the flow controlling valve to the reservoir. These tests have also proved that this pressure in the feed line, if the water under pressure is not consumed at a rate greater than the maximum volume of the pump discharged, is maintained at the pressure selected irrespective of the character of machines which are connected to the feed line and whether these machines are working or not. So long as the pump is operating, this predetermined pressure is maintained and this pressure can be varied in a few seconds from maximum to zero and vice versa.

To change the pressure maintained in the feed line, as for instance, when more or fewer machines are being operated, the control weight 78 must be moved and this is accomplished by rotating the crank arm 84. To this end, the locking pin 86 is pushed inward, releasing the dog 96. Then the arm 84 is shifted to shift the weights to the proper position and again locked. The weight sections 78 are removable and can be varied in thickness or number in order to secure the proper amount of weight necessary to produce the maximum pressure at the maximum length of the weight arms, that is, at the maximum distance from the center of the pivot pins 71. My construction, as previously detailed, permits the connecting pivots of the links 20 to be located at the minimum distance possible from the fulcrum pins 71 and the advantage in this is that it secures the maximum length of the weight arms for the maximum pressure with a given control weight and makes the overall length of the weight arms 64 as short as possible and control weight as light in weight as possible. The balance weight 67 is securely fastened to the end yoke 66 and provides an equilibrium balance for the weight arms 64, the links 20, the cross head 21, the sprocket chain 98, the pins 76 and the brackets 95, so that the control weight 77 and 78 alone produces a pressure on the water through the cross head 21 and the ram 23. It will be noted that the balance weight 67 is made in two parts 67 and 67ª and the small weight 67ª can be varied in thickness in order to produce the proper balance for the weight system, as stated above.

It will be seen from Figure 5 that the base plate 12, which is supported by the side members 10, has a central opening 16 and a counter-bore 16ª into which a projection on the under face of the flange 17 of cylinder 18 is inserted, thus positively anchoring the cylinder 18 in relation to the frame and weight arms so that perfect alinement can be maintained at all times between the cross head 21 and the weight arms 64 through links 20 and thus the resistance to the movement of the control arms 64 is reduced to a minimum. The flange 17 is intended to be bolted or otherwise securely attached to the base 12.

It will be noted from a comparison of Figures 7 and 3 that the cross bar 26 carried upon the cylinder 18 is disposed at an angle of less than 90° to the longitudinal axis of the weight carrying frame and that the enlarged bearing portions 21ª of the cross head are also disposed at an angle less than 90° to the longitudinal axis of the weight carrier and that the cross bar 28 is disposed at the same angle. This is for the purpose of securing better construction and a more ready assembly and for keeping the width of the controller to a minimum. Furthermore, this construction allows easy access to the tie rod nuts and to the adjacent screws 24 and 41, and keeps these parts clear from the interference of links when screwing home the nuts 32.

It will be noted in Figure 5 that the gland 38 is counter-bored at 38ª so that the lower edge of the member 39 in its reciprocating movement will not wear a shoulder in the bore of the gland and thus prevent the valve operating rod from making a full stroke when it becomes necessary for it to do so. A stop washer 38ᵇ is securely fastened to the lower end of the gland which has an aperture through the center slightly larger than the reduced lower end of the member 39. This stop washer prevents the valve operating rod 39 from dropping out when it is not in operation which it would otherwise do inasmuch as it is not connected to the rod 52 in any way. Reverting to the fact that the valve operating rod 52 is inserted in a recess in the upper end of the member 39, it is pointed out that this depression or recess prevents the end of the valve connecting rod 52 from slipping and bending under load when there is misalinement between the valve stem 39 and the valve operating rod 52 due to improper machine work on the component parts, new leather packing or wear of the valve seats. No matter how this misalinement develops, the valve 44 will always seat properly on the valve seat bushing and make a tight joint due to the free movement of the valve stem within the recess in the upper end of the member 39. The tension of the spring 49 may be regulated by adjusting the plug 50 in or out or by inserting washers between the plug and the spring. By forming the weight consisting of the parts 77 and 78 with a central passage that extends all the way through the weight and parallel with the chain 98, a clear passage is provided for the chain at all times.

By adjusting the screw 24, the operating stroke of the ram 23 may be varied while the upper screw 42 is adjusted to vary the extent of opening of the valve. This permits adjustment to be made to compensate for wear in the valve seat. These are important adjustments upon which the smooth operation of the pressure and flow controller depends.

It is reiterated that the vertical center of the fulcrum pins 71 is also the center of the sprocket wheel 103 and horizontally the center of the fulcrum pins 71 intersects the pitch line of the sprocket and chain so that the horizontal and vertical axes of the fulcrum pins and chain are the same. Thus, it will be clearly seen that any vertical movement or rotation of the control weight arms or frame with the chain thereon takes place on the center of the fulcrum pin and that movement is circumferential about that center and not radial. Hence, the control weight remains at whatever position it is set on the weight arms. Thus, the pressure is kept constant irrespective of how many times the weight arms move up and down. Variation in pressure is produced by moving the control weight on the weight supporting frame or arms and when the control weight remains in one position, the pressure for that position is constantly maintained. This maintenance of constant pressure when once the weight has been set is a very important factor in the successful operation of hydraulically operated mechanisms.

In Figure 10, I have illustrated diagrammatically the connection of the pump to the press or other machine and the connections to the reservoir and to the pump. In this diagram, the pressure line 109 leads to any ordinary operating valve and from thence to the machine and back again through the operating valve to the reservoir. The outlet pipe 59 discharges into this reservoir and from this reservoir a suction line 110 leads up to the pump. If the valve 44 is closed, all of the water will pass to the machine and do its work. If, on the other hand, the volume of water be greater than it is necessary to operate the machine, it will act through the mechanism heretofore described to lift the valve 44 and allow a certain portion of the water to escape. It is to be noted that I have used antifriction bearings at all points where it is necessary to reduce frictional resistance to the movement of the parts and that I have provided means at 75 and 94, for instance, whereby the bearings can be kept well-lubricated. Reduction of frictional resistance is a very important factor in the operation of this controller. In order that the pressure gauge 63 shall register the true pressure of the water, the frictional resistance of all moving parts should be zero. This, of course, is impossible, but I do reduce this frictional resistance close to zero by using antifriction bearings of the ball or roller type wherever it is possible and provide lubricating means so that all the moving parts are well lubricated and their resistance reduced as low as possible. Attention is also called to the fact that the locking mechanism for the handle 84 is of such a nature that it gives a micrometric adjustment for pressure variations so that this machine can be used for scientific and research work as well as for controlling feeding fine hydraulic machine tools. It will be seen that the handle 84 can be shifted one tooth over the rack 83 and that this very slight shifting movement of the handle will give a very slight shift to the weights 77 and 78 so that thus I secure a very fine adjustment of the weights. This fine adjustment is the result of the fine pitch of the teeth used in the segment 83, and it will be obvious that an even finer adjustment can be readily secured by increasing the number of teeth and their pitch.

It will be seen that my structure constitutes a pressure and flow controller; the ram 23 controlling pressure and the valve 44 controlling flow. It is obvious that there cannot be produced any pressure on a liquid without producing a tendency for that liquid to flow. When the liquid is prevented from flowing when pressure is applied, the hydraulic pressure is, of course, static pressure but when the liquid is allowed to flow when pressure is applied, it generates kinetic pressure. A liquid cannot perform work unless that liquid flows and when it flows, it does work in overcoming resistance in its path. My controller is a kinetic controller and not a static controller. It controls the kinetic energy of a liquid that is in motion, because the pump P never stops, during a working period, while the presses or other machines controlled by my controller stopped working after each individual operation, and since my controller maintains the resistance against which the pump must work, the liquid must be kept flowing in a regulated and controlled way, otherwise the pipe will burst or the pump will be stalled. The maximum pressure that any hydraulic system can have depends upon the maximum force that the pump can develop. No instrument applied to the hydraulic system should offer any greater resistance than the maximum force produced by the pump as if it does, the pump will stop in its work. My controller regulates the pressure and flow from zero to maximum and vice versa, that the pump is capable of delivering. When my controller is set for a given pressure, it controls the volume of flow of the liquid from zero to maximum. There is no reduction in the pressure when the presses or machines are stopped. The pump has at all times the same resistance to overcome whether the machines are working or not, because my controller maintains that resistance even though the full capacity in gallons pumped by the pump is discharged through the control valve 29 to the waste pipe. So long as the system is closed and not open to the atmosphere by the bursting of a pipe or valve, the pressure is maintained by my controller. Pressure cannot be produced on a liquid unless it is restricted in its flow. The pressure varies directly as the resistance to flow. The control weights 77 and 78 acting through the cross head 21 and ram 23 produces a resisting force on the liquid in the feed line 109 which connects with the pump. The operating valve at the machine stops the flow of the liquid to the machine from the pump and since the liquid must continue to flow as long as the pump works, the liquid then seeks a way out, thus causing the ram 23 to rise and through the cross head lift the valve 44 from its seat 43, hence allowing the liquid to flow in a restricted path and under a resistance which is maintained by the control weights 77 and 78, therefore maintaining the pressure for which the controller is set. The pressure for which the controller is set controls and maintains the pressure in connecting pipe 57, by-pass 61 and feed line 109, and in every pipe line connected in that system.

It will be seen that my controller produces and maintains a constant pressure per square inch in the feed line at all times and that is the resistance against which the pump must work and has no connection with the working of the press. The press can work or not, which makes no difference as to the pressure in the feed line. When the press works, the liquid flow into the reservoir stops and the liquid flows into the cylinder of the press, and as soon as the cylinder of the press is filled, the flow to the reservoir is immediately resumed without any shock to the pump, press or feed line. As a matter of fact, by actual test, it has been found that the gauge of the controller gives no indication when the press is put into operation and when the return line is watched, if a portion of the return line be transparent, the operator will see the liquid stop and start flowing, but without any vibration, shock or noise either in the pipe lines or the controller. The motor may be stopped and started while the controller is under maximum pressure or under zero pressure any number of times per minute and obtain the same results. The pressure can be increased or decreased in an instant from zero to maximum or vice versa, and there will be no vibration, shock or noise of any kind in the pump, press or feed line. Ordinary standard butt-welded pipe (which is never used for any greater pressure than 500 lbs. per square inch, because it cannot stand shock which is present in the present hydraulic systems) may be used in the pipe line and connections with my controller because such pipe will stand pressure though it will not stand shock.

It is particularly pointed out that the ram 23 in cylinder 18 floats upon the liquid as long as the pump works and maintains a close contact through the adjusting screws or contacts 24 and 42 with the valve stem 39. These contacts are adjustable, as described and as illustrated, and this is very important to the successful operation of the controller. When these contacts are not adjusted properly, they will cause the controller to work irregularly or stop altogether as they will fail to control the valve and the control weight in unison. These contacts are the connecting links between the control weight 77 and the control valve 44. Their proper adjustment depends upon the size of the controller and the frictional resistance of the moving parts of the controller.

The valve 44 which controls the flow of the liquid is operated by the ram 23 in cylinder 18. The spring 49 in actual practice is so constructed as to exert a twenty-five pound compressive force when compressed $\frac{3}{16}''$ within the gland 48. It must be borne in mind that whatever pressure the control weight 77 is set for, that pressure manifests itself on the packing of the stuffing box 36 and the valve body 29, creating frictional resistance between the valve stem 47 and the packing and also an additional frictional resistance is produced by the packing in the valve body 29 around the valve rod 39. These frictional resistances must be overcome in order that the valve 44 can work freely, and to that end, this spring 49 is provided. The force of the 25 pounds exerted by the spring overcomes all the frictional resistance that the valve stem and operating valve meet with in their operating movement, but this force has no connection with the pressure of the liquid. The spring 49 is set at a pressure just enough to overcome the frictional resistance of the moving parts of the control valve and remains at that pressure irrespective of whatever pressure the controller is set to work at. Of course, it is to be understood that in stating that the spring 49 exerts a pressure of 25 pounds, I am stating merely one example. The pressure of the spring will vary, of course, with the dimensions of the controller and the frictional resistance acting to resist the movement of the valve rod 39 and the valve stem 47.

From what is stated above, it will be seen that my control valve operates on a principle that is totally different from the operation of the general or common relief valve used in the present hydraulic systems. In the usual system, the relief valve is held to its seat by a force which is from 20% to 25% greater than the resistance offered by the press or other machine to the feed line. Thus when the press offers a resistance of a thousand pounds per square inch, the relief valve is opened at 1200 to 1300 pounds per square inch, and that force holding the relief valve to its seat remains whether the resistance is zero or maximum. The relief valve does not create any pressure on the liquid but the liquid must exert a pressure in order to open the valve greater than the pressure holding the valve closed in order that the liquid may escape. The pump does not pump against a fixed resistance when the relief valve is used, this resistance being always variable, while in the use of my controller which embodies a ram floating upon the liquid in the line, the pump works against a fixed resistance as long as the pump works at all.

It is to be particularly noted that the ram 23 has a certain free movement in the cylinder 18 before it affects the valve 44. Therefore, the ram floats on the liquid and moves up and down with its flow and through that movement controls the control valve as necessary, without increasing or diminishing the pressure in the feed line or the resistance on the pump. The control weight 77, when set at zero, can be moved to increase the pressure by moving the crank 84 along the locking sector 82 at a rate which is fixed by the pitch of the teeth of the locking sector. The rate of change can be increased or decreased as required by changing the pitch of these teeth. The controller is very sensitive to any change whether it is an increase or a decrease in the pressure or flow of the liquid.

While I have illustrated certain details of construction and a certain specific arrangement of parts, which I have found to be thoroughly practical, yet I do not wish to be limited to this as obviously many changes might be made in the details of construction and of arrangement without departing from the spirit of the invention as stated in the appended claims.

What is claimed is:

1. For use in connection with a fluid pressure generator and a machine operated thereby and connected thereto by a pressure delivery pipe line; a flow pressure controller including a supporting frame, a ram cylinder mounted upon the supporting frame and having laterally projecting arms, guide rods extending upward from said arms, a valve casing having laterally projecting arms with which said guide rods engage, means on the rods holding the valve casing on said rods in spaced relation to said cylinder, a pressure supply pipe extending into the upper portion of the valve casing, a single outlet pipe extending from the lower portion of the valve casing, a valve seat between the two pipes, a flow controlling valve coacting with the seat and urged towards its seat, a pressure controlling ram in the ram cylinder, a pipe leading from the pressure supply pipe into the lower end of the ram cylinder, a cross head disposed between the ram cylinder and the valve casing and through which the guide rods pass, a vertically adjustable ram engaging member mounted on the under side of the cross head, the valve having a stem extending downward through the lower end of the valve casing, a vertically adjustable member mounted on the cross head and engageable with the valve stem when the cross head rises to open the valve, a weight supporting member pivotally mounted upon the frame below the ram of the cylinder, the pivot for said member being disposed closely adjacent to the vertical axis of the ram and valve, links pivoted to the cross head and at their lower ends pivoted to said weight supporting member at points closely adjacent the fulcrum of said member and approximately in alinement with the vertical axis of the valve and ram, a weight slidingly mounted upon the weight supporting member, and means for adjusting said weight toward or from the fulcrum of the weight supporting member.

2. For use in connection with a fluid pressure generator and a machine operated thereby and connected directly thereto by a pressure delivery pipe line; a flow and pressure controller including a supporting frame, a ram cylinder mounted upon the supporting frame and having laterally projecting arms, guide rods extending upward from said arms, a valve casing having laterally projecting arms with which said guide rods engage, means on the rods holding the valve casing on said rods in spaced relation to said cylinder, a pressure supply pipe extending into the upper portion of the valve casing, a single outlet pipe extending from the lower portion of the valve casing, a valve seat between the two pipes, a flow controlling valve coacting with the seat and urged towards its seat, a pressure controlling ram in the ram cylinder, a pipe leading from the pressure supply pipe into the lower end of the ram cylinder, a cross head disposed between the ram cylinder and the valve casing and through which the guide rods pass, a vertically adjustable ram engaging member mounted on the under side of the cross head, the valve having a stem extending downward through the lower end of the valve casing, a vertically adjustable member mounted on the cross head and engageable with the valve stem when the cross head rises to open the valve, weight supporting arms, yokes rigidly connecting said arms, the arms being pivotally mounted upon the frame at points closely adjacent a vertical plane extending downward through the valve and ram and transverse to the weight supporting member, the arms having laterally projecting trunnions disposed in approximate vertical alinement with the ram and valve, links pivotally connected to the cross head and to said trunnions, a weight slidingly mounted upon the weight supporting arms, the weight having a recess at the middle of its under face, sprocket wheels carried by said yokes, a sprocket chain trained over the sprocket wheels, inwardly projecting vertically recessed members mounted upon the opposite walls of the recess in the weight, opposed lugs carried by the chain and engaging in the recesses of said members, a shaft mounted in the frame below the arms and in vertical alinement with the pivotal supports for the arms, a sprocket wheel carried upon the shaft and engaging the lower flight of the sprocket chain, means for rotating the shaft to thereby shift the chain and adjust the weight nearer to or further from the fulcrum of the arms, and means for locking the shaft in any adjusted position.

3. For use in connection with a fluid pressure generator and a machine operated thereby and connected thereto by a pressure delivery pipe line; a flow and pressure controller including a supporting frame, a ram cylinder mounted upon the frame and having arms, vertical guide rods extending upward from the arms, a valve chamber carried rigidly upon the upper ends of said guide rods, an intermediate cross head slidingly mounted upon the guide rods, a pressure controlling ram in the ram cylinder engageable on its upward movement with the cross head, the valve casing having an upper chamber and a lower chamber with an intermediate valve seat, a pressure supply pipe opening into the upper chamber, a single discharge pipe opening from the lower chamber, a pipe leading from the pressure supply pipe into the lower end of the ram cylinder below the ram, a flow controlling valve disposed in the upper chamber and coacting with said seat and having an upwardly extending portion, a stuffing box through which this upwardly extending stem of the valve passes, a hollow gland surrounding the upper end of the stem, a spring within the gland bearing against the stem and urging the valve downward, a stem extending downward from the lower end of the valve and extending through the lower chamber, a stuffing box in the lower end of the valve, a valve stem section fitting in and movable through the stuffing box and having a recess in its upper end into which the depending valve stem extends, the lower valve stem section extending beyond the stuffing box toward the cross head and engageable by the cross head upon an upward movement thereof, depending links connected with the cross head, and adjustable weighted means operatively coupled with said links for yieldingly resisting upward movement of the cross head under the action of the ram.

4. For use in connection with a fluid pressure generator and a machine operated thereby and connected thereto by a pressure delivery pipe line; a flow and pressure controller including a valve casing having an inlet pipe and a single outlet pipe, a flow controlling valve in the casing between the inlet pipe and outlet, a pressure controlling ram cylinder, a ram therein, means acting to open the valve when the ram is raised, a pipe connection between the inlet pipe and the lower end of the ram cylinder, weighted means yieldingly resisting the lifting movement of the ram including a weight supporting member, a frame having lateral portions between which the weight supporting member is disposed, trunnions projecting outward from the weight supporting member, anti-friction bearings in the lateral portions of the frame within which said trunnions are mounted, the ram actuated valve opening means having a linked connection to the weight supporting member, the links being pivoted to the weight supporting member at opposed points closely adjacent to the trunnions of the weight supporting member.

5. For use in connection with a fluid pressure generator and a machine operated thereby and connected thereto by a pressure delivery pipe line; a flow and pressure controller including a valve casing having an inlet pipe and a single outlet pipe, a flow controlling valve between the inlet pipe and outlet pipe, a ram cylinder, a ram therein, means acting to open the valve when the ram is raised, a pipe connection between the inlet pipe and the lower end of the ram cylinder whereby the pressure in the inlet pipe supports the ram, weighted means yieldingly resisting lifting movement of the ram under such pressure including two side arms, yokes connecting the arms, trunnion carrying elements each having feet engaging the arms and spacing the body of the trunnion element from the arms, trunnions engaged with said elements and projecting laterally therefrom, a supporting frame into which said trunnions extend, the trunnions being disposed closely adjacent to the vertical axis of said ram and valve, a member vertically shiftable by said ram and when raised operatively engaging the valve to lift it from its seat, links extending downward from said member and pivotally connected to the side arms of the weight supporting frame, the links extending between said trunnion supporting members and the arm and being pivoted closely adjacent to said trunnions, a weight slidingly mounted upon the arms, and means for adjustably shifting said weight nearer to or further from the trunnions.

6. For use in connection with a fluid pressure generator and a machine operated thereby and connected directly thereto by a pipe line flow and pressure controller including a valve casing having an inlet pipe and a single outlet pipe, a valve controlling flow between the inlet and outlet pipes, the inlet pipe being connected to a source of liquid under pressure, a ram cylinder, a pressure controlling ram therein, means operatively connecting the ram and valve and acting to open the valve when the ram is raised, a pipe connection between the inlet pipe and the lower end of the ram cylinder, weighted means yieldingly resisting the lifting movement of the ram and including a frame, a weight supported on said frame for movement longitudinally thereof, trunnions projecting outward from the weight supporting frame, anti-friction bearings in the lateral portions of the frame in which said trunnions are mounted, the ram actuated valve opening means having a linked connection to the frame, the links being pivoted to the frame at opposite points closely adjacent the trunnions thereof, a shaft disposed below the weight supporting frame and having means engaging the weight to shift it along the frame nearer to or further from the trunnions thereof, and anti-friction bearings in which said shaft is mounted.

7. A pressure and flow controller for an hydraulic pressure line including a valve casing having an outlet pipe and an inlet pipe, a ram cylinder, a pressure controlling ram therein, a pipe connection between the inlet pipe and the lower end of the ram cylinder, a flow controlling relief valve in said valve casing, means operatively engaging the ram with the valve to cause the opening of the valve when the ram is raised a predetermined distance by an increase of pressure in the inlet pipe, means yieldingly resisting the lifting movement of the ram including a weight supporting member having two parallel arms, a main frame having lateral portions between which the weight supporting arms are disposed, trunnions projecting from the weight supporting arms and engaging the lateral portions of the main frame, the ram actuated valve-opening means having a linked connection to said arms and being pivoted to the arms at points closely adjacent the trunnions of the weight supporting arms, a weight slidingly mounted upon the arms for movement toward or from the trunnions, said weight comprising lateral sections recessed upon their outer faces to partially embrace the weight supporting arms and one or more transverse weight sections mounted upon the lateral weight sections and detachably engaged therewith, and means for holding the weight in any adjusted position upon the arms.

8. For use in connection with a fluid pressure generator and a machine operated thereby and connected directly thereto by a pipe line, a pressure and flow controller including a valve casing having an inlet pipe and having a single outlet pipe, a flow controlling valve in said casing disposed between the inlet and the outlet thereof and urged to a closed position, a cylinder, a pressure controlling ram therein, the lower end of the cylinder having a pipe connection to the said inlet pipe of the valve casing, a cross-head between the cylinder and the valve casing operatively engaged by said ram to be raised and lowered thereby, the raising of the cross-head a predetermined distance lifting the valve from its seat, a member pivoted between its ends to provide relatively long and short arms, the member being operatively connected to the cross-head to move therewith, means on the short arm of the member counterbalancing the long arm thereof, a weight slidably mounted upon the pivoted member, an endless chain mounted upon said member and operatively connected to the weight to shift it longitudinally of the member, and means engaging said chain whereby the chain may be shifted to shift the weight nearer to or further from the pivot of said member.

9. For use in connection with a fluid pressure generator and a machine operated thereby and connected directly thereto by a pipe line; a pressure and flow controller including a valve casing having an inlet pipe, the casing having a single outlet pipe, a valve in the casing disposed between the inlet and the outlet of said casing and urged to a closed position, a cylinder disposed in axial alinement with the valve casing and having a pressure controlling ram therein, a pipe connection between the inlet pipe of the casing and the lower end of said cylinder below the ram, a cross-head disposed above the ram and having an adjustable abutment with which the ram is adapted to engage, the valve having a stem extending downward therefrom and through the valve casing, the cross-head having an adjustable abutment engaging said stem when the cross-head is lifted a predetermined degree, guides for said cross-head, links pivoted to the cross-head and extending downward, a supporting frame, a member pivoted intermediate its ends upon the supporting frame and to which the links are pivotally connected closely adjacent the pivot for the member, a weight adjustable along said member toward or from its fulcrum, the pivoted member thus resisting movement of the cross-head toward the valve casing to open the valve, and a counterbalance for the long arm of the weight supporting member.

10. For use in connection with a fluid pressure generator and a machine operated thereby and connected directly thereto by a pipe line; a pressure and flow controller including a valve casing having an inlet pipe and an outlet pipe, a valve disposed between the inlet and the outlet of the valve casing and urged to a closed position and having a stem extending out through the lower end of the casing, a cylinder disposed in axial alinement with the valve casing, a ram operating within the cylinder, a pipe leading from the entrance side of the inlet pipe into the lower end of the ram cylinder whereby the pressure on the inlet side of the valve casing will be the same as upon the lower end of the ram, a cross-head disposed between the ram and the valve casing, vertical guides for said cross-head, adjustable members on the cross-head adapted to be engaged respectively by said ram and to engage with the stem of said valve, links pivoted to the cross-head and depending therefrom, a supporting frame below the cylinder, parallel rails and yokes connecting the ends of said rails, the yokes and rails together constituting a weight supporting element, said element being fulcrumed adjacent one end upon the first-named frame at a point closely adjacent to the axial center of the ram, the lower ends of the links being pivoted to the weight supporting element to one side of but closely adjacent the fulcrum of the element, a weight slidingly mounted upon the rails of said weight supporting element, the weight being cut away at its middle, an endless chain disposed within the weight supporting element, end sprocket wheels upon which the chain is mounted, the chain having operative engagement with the weight, a sprocket wheel engaging the chain, means for rotating the sprocket wheel to shift the chain and weight, means for locking the sprocket wheel in any shifted position, and a counterweight on the short arm of the weight supporting element and counterbalancing the long arm thereof.

BENJAMIN BROWNSTEIN.